(No Model.) 2 Sheets—Sheet 1.

J. R. LITTLE.
METALLIC WHEEL.

No. 334,252. Patented Jan. 12, 1886.

(No Model.) 2 Sheets—Sheet 2.
J. R. LITTLE.
METALLIC WHEEL.
No. 334,252. Patented Jan. 12, 1886.
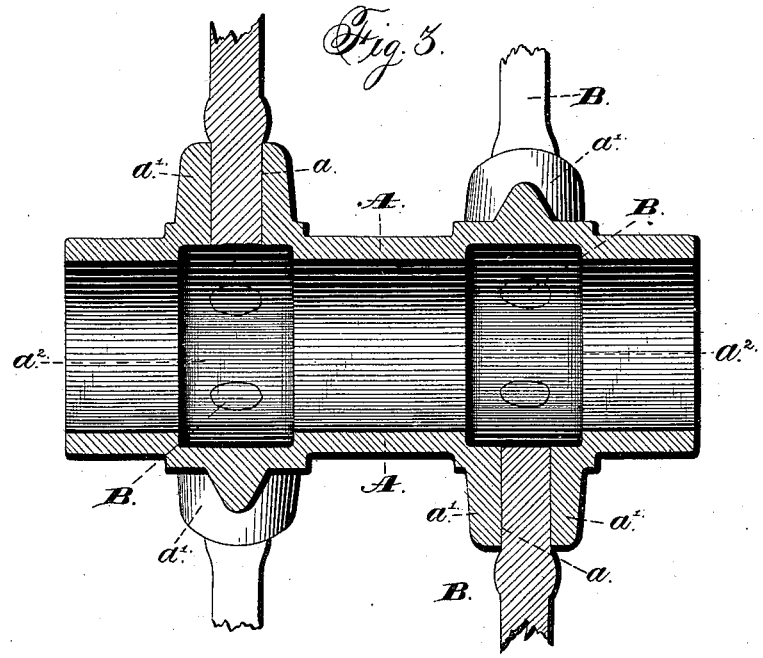
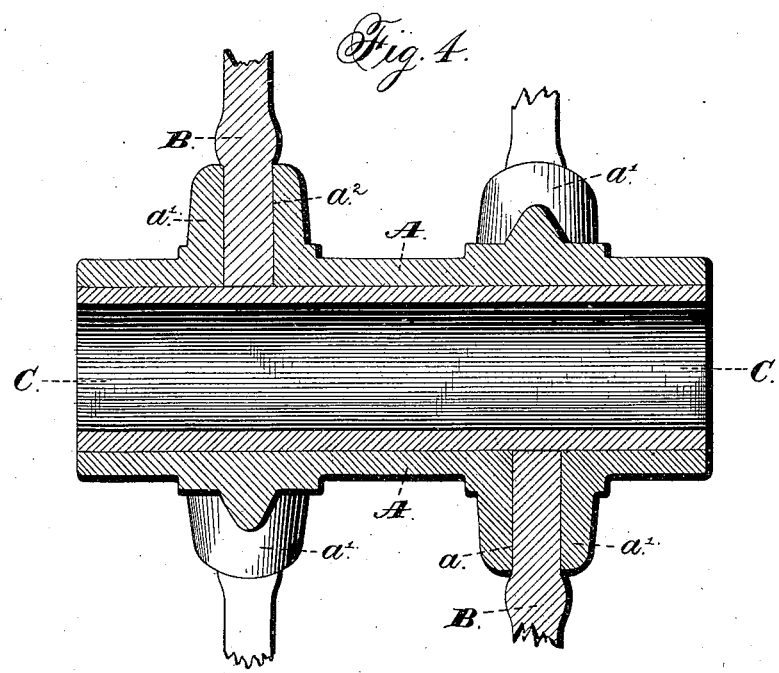
Witnesses:
Jas. E. Hutchinson
Henry C. Hazard
Inventor.
James R. Little, by
Prindle and Russell, his Attys

United States Patent Office.

JAMES R. LITTLE, OF QUINCY, ILLINOIS, ASSIGNOR, BY MESNE ASSIGNMENTS, TO THE QUINCY METAL WHEEL COMPANY, OF SAME PLACE.

METALLIC WHEEL.

SPECIFICATION forming part of Letters Patent No. 334,252, dated January 12, 1886.

Application filed June 2, 1884. Serial No. 133,603. (No model.)

*To all whom it may concern:*

Be it known that I, JAS. R. LITTLE, of Quincy, in the county of Adams, and in the State of Illinois, have invented certain new and useful Improvements in Metal Wheels for Agricultural Implements, &c.; and I do hereby declare that the following is a full, clear, and exact description thereof, reference being had to the accompanying drawings, in which—

Figure 1:
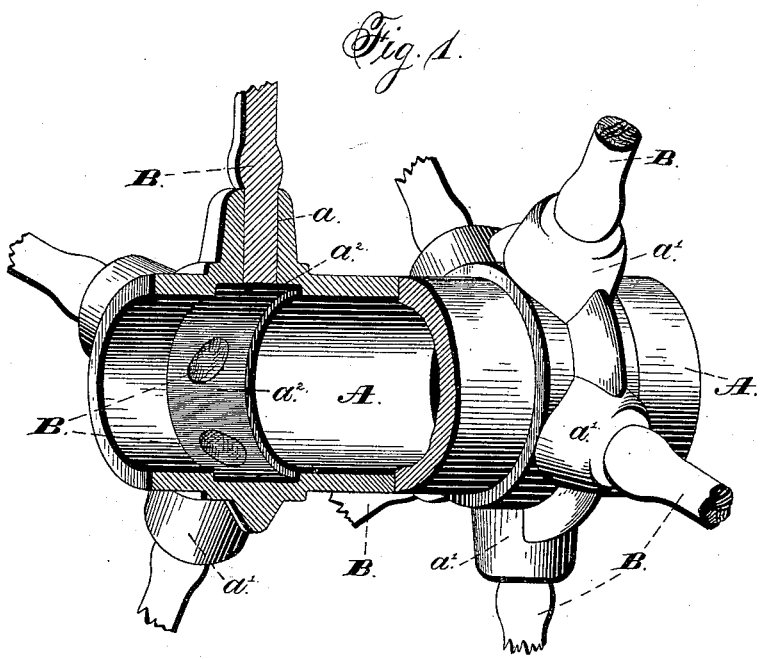
Figure 2:
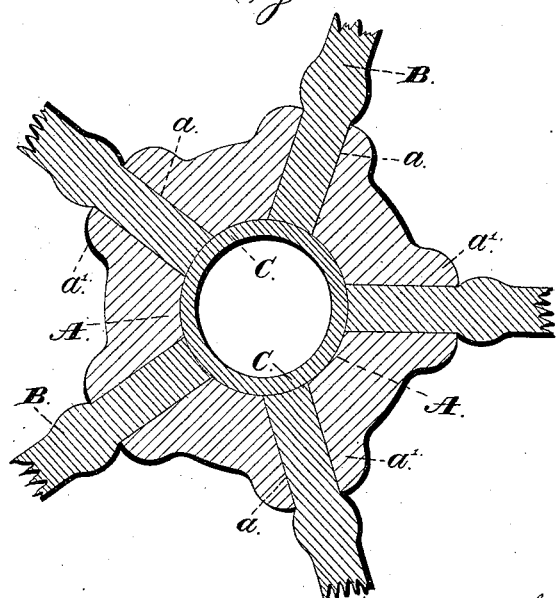

Figure 1 is a perspective view of the form of hub preferably used by me in the construction of my wheel, a portion of the same being broken away to show the interior. Fig. 2 is a cross-section of the hub, employed where a box is required; and Figs. 3 and 4 are respectively sections upon lines passing through the axes of the spokes of the hubs shown in said Figs. 1 and 2.

Letters of like name and kind refer to like parts in each of the figures.

The design of my invention is to produce a metal wheel in which the spokes are secured within the hub so firmly as to not be liable to become loosened or displaced by any ordinary usage. To which end said invention consists, principally, in a metal wheel in which the hub is provided with mortises that extend into the axial opening of said hub, in combination with spokes that are each secured within a mortise by radial enlargement of the portion contained therein, substantially as and for the purpose hereinafter specified.

It consists, further, in a metal wheel in which the hub is provided with radial mortises that extend into the axial opening of the same, and each mortise contains a spoke that is caused to closely fill the same by radial expansion, and is provided with an enlargement at or immediately beyond the outer end of said mortise, substantially as and for the purpose hereinafter shown.

It consists, finally, in a metal wheel in which the hub is provided with radial mortises that extend from its outer side into a circumferential groove, which is formed within the interior of said hub, and each mortise contains a spoke that is caused to closely fill the same by radial expansion, substantially as and for the purpose hereinafter set forth.

In the application of my invention to practice I employ a metal hub, A, which is provided with radial mortises $a$ for the reception of spokes B. The outer end of each of said mortises is preferably surrounded by an enlargement, $a'$, for the purpose of giving the desired length and securing the necessary strength without causing said hub to have undue weight, while at its inner end each mortise preferably terminates in a groove, $a^2$, which extends circumferentially around the interior of said hub. There are preferably two rows of said mortises, and the same are relatively arranged so as to cause the spokes to present the appearance known as "staggered."

Within each mortise $a$ is inserted the inner end of one of the spokes B, and such part then caused to closely fill the same by being compressed longitudinally from its inner end to a point a little outside of the outer end of said mortise. Such longitudinal compression is preferably caused to produce an enlargement, $b$, upon said spoke immediately outside of the hub A. The groove $a^2$ within the interior of said hub serves to contain the ends of any of the spokes which may project beyond the mortises, and thereby leave the axial opening of said hub clear; but, if desired, said groove may be omitted and any projections dressed off.

When desired, a box, C, may be used within the hub A, in which event said box is preferably inserted after the spokes B are placed in position; but it may be inserted before, if desired, when it will serve as an anvil against which the inner ends of said spokes may be forced for the purpose of producing the requisite longitudinal compression. The spokes and hub thus united are strong and durable, and it is not believed possible to loosen the one from the other by any use to which the wheel would ordinarily be subjected.

I do not claim herein a hub in combination with spokes which are secured in position therein by a rivet-head within the interior of the hub and a flange or bead on the exterior.

Having thus described my invention, what I claim is—

1. A metal wheel in which the hub is provided with mortises that extend into the axial opening of said hub, in combination with spokes that are each secured within a mortise by radial enlargement of the portion contained therein, substantially as and for the purpose specified.

2. A metal wheel in which the hub is provided with radial mortises that extend into the axial opening of the same, and each mortise contains a spoke that is caused to closely fill the same by radial expansion, and is provided with an enlargement at or immediately beyond the outer end of said mortise, substantially as and for the purpose shown.

3. A metal wheel in which the hub is provided with radial mortises that extend from its outer side into a circumferential groove which is formed within the interior of said hub, and each mortise contains a spoke that is caused to closely fill the same by radial expansion, substantially as and for the purpose set forth.

In testimony that I claim the foregoing I have hereunto set my hand this 7th day of April, A. D. 1884.

JAMES R. LITTLE.

Witnesses:
F. M. McCANN,
JOHN W. RICKART.